(12) United States Patent
McNaughton

(10) Patent No.: US 11,772,311 B1
(45) Date of Patent: Oct. 3, 2023

(54) METHOD OF MANUFACTURING A FISHING LURE

(71) Applicant: Braxton McNaughton, Greenville, AL (US)

(72) Inventor: Braxton McNaughton, Greenville, AL (US)

( * ) Notice: Subject to any disclaimer, the term of this patent is extended or adjusted under 35 U.S.C. 154(b) by 0 days.

(21) Appl. No.: 17/882,129

(22) Filed: Aug. 5, 2022

(51) Int. Cl.
| | |
|---|---|
| *B29C 45/16* | (2006.01) |
| *B29C 45/26* | (2006.01) |
| *A01K 85/00* | (2006.01) |
| *B29L 31/00* | (2006.01) |
| *B29K 27/06* | (2006.01) |

(52) U.S. Cl.
CPC .......... *B29C 45/16* (2013.01); *A01K 85/1897* (2022.02); *B29C 45/164* (2013.01); *B29C 45/26* (2013.01); *B29C 2045/1698* (2013.01); *B29K 2027/06* (2013.01); *B29K 2995/002* (2013.01); *B29L 2031/7002* (2013.01)

(58) Field of Classification Search
CPC ... B29C 45/16; B29C 45/164; B29C 45/1698; B29C 2045/1698
See application file for complete search history.

(56) References Cited

U.S. PATENT DOCUMENTS

| | | | | |
|---|---|---|---|---|
| 3,950,483 A | * | 4/1976 | Spier | .................... B29C 45/164 264/DIG. 83 |
| 4,141,170 A | | 2/1979 | Fosher | |
| 6,554,605 B1 | | 4/2003 | McNaughton | |
| 2006/0177668 A1 | * | 8/2006 | Asai | ........................ B32B 27/18 264/328.8 |
| 2006/0214324 A1 | * | 9/2006 | Wang | .................. B29C 45/1676 264/161 |
| 2019/0021300 A1 | | 1/2019 | Smith et al. | |
| 2020/0315152 A1 | | 10/2020 | Garrison | |
| 2021/0137084 A1 | | 5/2021 | Koppers et al. | |

FOREIGN PATENT DOCUMENTS

| | | | |
|---|---|---|---|
| CN | 207344970 | | 5/2018 |
| CN | 207344989 | | 5/2018 |
| CN | 210362194 | | 4/2020 |
| CN | 212684533 | | 3/2021 |
| DE | 102012025039 | * | 6/2014 |
| FR | 2286702 | * | 4/1976 |
| FR | 2290149 | | 6/1976 |
| FR | 2747269 | | 10/1997 |
| GB | 1157282 | | 7/1969 |
| JP | 58191139 | * | 11/1983 |

(Continued)

*Primary Examiner* — Edmund H Lee
(74) *Attorney, Agent, or Firm* — Taylor English Duma LLP

(57) ABSTRACT

The mold apparatus disclosed herein is configured for simultaneous communication of a resin having a color and a complementary resin having a complementary color into a mold cavity without intermixing between the resin and the complementary resin in order to form an object wherein the color is essentially separated from the complementary color, in various aspects. In various aspects, the object formed by the mold apparatus may be configured as a fishing lure body, which is a molded portion of a fishing lure. The fishing lure body has a top and a bottom, and the top is of the color and the bottom is of the complementary color, in various aspects. Related methods and manufactures are disclosed.

8 Claims, 7 Drawing Sheets

(56) References Cited

FOREIGN PATENT DOCUMENTS

| | | | |
|---|---|---|---|
| JP | 61104816 | * | 5/1986 |
| JP | 0820040 | | 1/1996 |
| JP | 3047530 | | 4/1998 |
| JP | 10276620 | | 10/1998 |
| JP | 10276621 | | 10/1998 |
| JP | 2009184278 | | 8/2009 |
| JP | 2011116087 | | 6/2011 |
| KR | 20190051101 | | 5/2019 |
| WO | WO7901111 | * | 12/1979 |
| WO | WO2009106634 | * | 9/2009 |

* cited by examiner

METHOD OF MANUFACTURING A FISHING LURE

FIELD OF THE INVENTION

This disclosure relates to apparatus for molding simultaneously an object having two colors separated from one another along a color divide and related methods and manufactures. The object may form a fishing lure body of a fishing lure in certain aspects.

BACKGROUND OF THE INVENTION

Fishing lure bodies of fishing lures may be designed to mimic at least portions of various prey. The prey, of course, attracts predators, so that the fishing lure attracts the predator by mimicking the prey. The prey may have two different colors. For example, a top portion of the prey that is generally oriented toward a water surface may have a color that camouflages the prey from predators looking down on the prey from above. The prey may, for example, include a bottom portion generally oriented away from the water surface that has another color that camouflages the prey from predators looking up toward the prey from below. In order to accurately mimic the prey per this example, the lure body should include two colors divided from one another just like the two colors of the prey. It may be desirable that the two colors of the fishing lure body are essentially separated from one another with little or no intermixing, for example, in order to accurately mimic the prey. However, it is difficult to achieve efficiently this separation of colors in a molded product.

Accordingly, there is a need for improved mold apparatus as well as related manufacturing methods for manufactures such as fishing lure bodies that include two colors separated from one another with little or no intermixing.

BRIEF SUMMARY OF THE INVENTION

These and other needs and disadvantages may be overcome by the apparatus, methods, and manufactures disclosed herein. Additional improvements and advantages may be recognized by those of ordinary skill in the art upon study of the present disclosure.

A mold apparatus, as disclosed herein, may include a die that defines a cavity having a cavity surface formed at least in part as a negative impression of a portion of an object surface of an object to be molded. A barrier is configured into the cavity surface, and the barrier extends from the cavity surface in gapped relation with a plane of a surface of the die, in various aspects. The barrier extends longitudinally along at least portions of the cavity surface comprising the negative impression of the portion of the object surface, in various aspects. The mold apparatus further includes a complementary die that defines a complementary cavity having a complementary cavity surface formed as a negative impression of another portion of the object surface of the object. A complementary barrier is configured into the complementary cavity surface, and the complementary barrier extends from the complementary cavity surface in gapped relation with a complementary plane of a complementary surface of the complementary die, in various aspects. The complementary barrier extends longitudinally along at least portions of the complementary cavity comprising the negative impression of the another portion of the object surface, in various aspects.

A mold cavity may be formed by biased engagement between the surface of the die and the complementary surface of the complementary die, with the mold cavity being defined by the cavity surface and the complementary cavity surface. The mold cavity is partitioned in part into a first mold sub-cavity and a second mold sub-cavity by the barrier and the complementary barrier that are longitudinally aligned with one another within the mold cavity, in various aspects.

A passage is in fluid communication with the first mold sub-cavity, with the passage being defined at least in part by the die to communicate fluidly a resin into the first mold sub-cavity. A complementary passage separated from the passage by a divider is in fluid communication with the second mold sub-cavity to communicate fluidly a complementary resin into the second mold sub-cavity, with the complementary passage being defined at least in part by the complementary die. The resin is fluidly communicated into the first mold sub-cavity from the passage simultaneously with fluid communication of the complementary resin into the second mold sub-cavity from the complementary passage, in various aspects.

A method of manufacture is disclosed herein that includes the step of forming a mold cavity by biasingly engaging a surface of a die with a complementary surface of a complementary die, with the mold cavity being defined by a cavity surface of a cavity formed in the die and a complementary cavity surface of a complementary cavity formed in the complementary die, in various aspects. The mold cavity is partitioned in part into a first mold sub-cavity and a second mold sub-cavity by a barrier extending forth from the cavity surface toward a plane defined by the surface and by a complementary barrier extending forth from the complementary cavity surface toward a complementary plane defined by the complementary surface, in various aspects. The barrier and the complementary barrier are in spaced relation and longitudinally aligned with one another, in various aspects. The method includes the step of communicating fluidly a resin into the first mold sub-cavity through a passage defined in part by the die, in various aspects. The method includes the step of communicating fluidly a complementary resin into the second mold sub-cavity through a complementary passage defined in part by the complementary die simultaneously while performing the step of communicating fluidly a resin into the first mold sub-cavity, in various aspects.

A fishing lure body made by certain methods is also disclosed herein. In various aspects, the fishing lure body includes a mold mark and a complementary mold mark in a surface of the fishing lure body, and the fishing lure body has a color divide generally coincident with the mold mark and the complementary mold mark. The fishing lure may be made, in part, by the step of forming a mold cavity by biasingly engaging a surface of a die with a complementary surface of a complementary die, with the mold cavity being defined by a cavity surface of a cavity formed in the die and a complementary cavity surface of a complementary cavity formed in the complementary die. The mold cavity is partitioned in part into a first mold sub-cavity and a second mold sub-cavity by a barrier extending forth from the cavity surface toward the surface and a complementary barrier extending forth from the complementary cavity surface toward the complementary surface, the barrier and the complementary barrier being in spaced relation and aligned longitudinally with one another, in various aspects.

The fishing lure may be made, in part, by the step of communicating fluidly a resin at a temperature and a pressure into the first mold sub-cavity through a passage defined in part by the die, the resin having a color. The fishing lure may be made, in part, by the step of communicating fluidly a complementary resin at a complementary temperature and a complementary pressure into the second mold sub-cavity through a complementary passage defined in part by the complementary die simultaneously while performing the step of communicating fluidly a resin at a temperature and a pressure into the first mold sub-cavity, the complementary temperature being essentially equal to the temperature and the complementary pressure being essentially equal to the pressure. The complementary resin may have a complementary color differing from the color. The fishing lure may be made, in part, by the step of curing the resin and the complementary resin thereby forming the fishing lure body.

This summary is presented to provide a basic understanding of some aspects of the apparatus, methods, and manufactures disclosed herein as a prelude to the detailed description that follows below. Accordingly, this summary is not intended to identify key elements of the apparatus, methods, and manufactures disclosed herein or to delineate the scope thereof

Figure 1A:
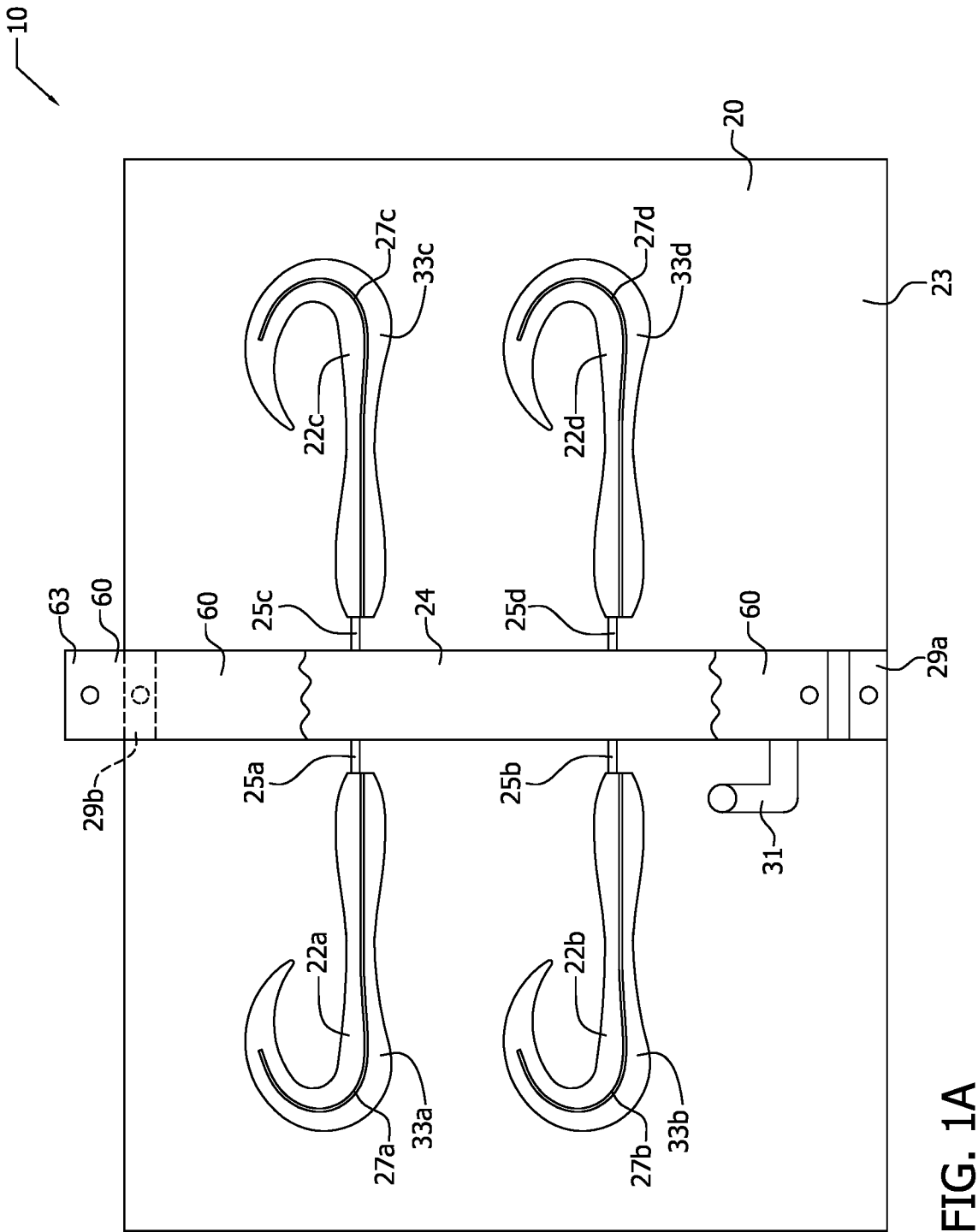
FIG. 1A illustrates by plan view a die portion of an exemplary implementation of a mold apparatus.

The Figures are exemplary only, and the implementations illustrated therein are selected to facilitate explanation. The number, position, relationship and dimensions of the elements shown in the Figures to form the various implementations described herein, as well as dimensions and dimensional proportions to conform to specific force, weight, strength, flow and similar requirements are explained herein or are understandable to a person of ordinary skill in the art upon study of this disclosure. Where used in the various Figures, the same numerals designate the same or similar elements. Furthermore, when the terms "top," "bottom," "right," "left," "forward," "rear," "first," "second," "inside," "outside," and similar terms are used, the terms should be understood in reference to the orientation of the implementations shown in the drawings and are utilized to facilitate description thereof. Use herein of relative terms such as generally, about, approximately, essentially, may be indicative of engineering, manufacturing, or scientific tolerances such as ±0.1%, ±1%, ±2.5%, ±5%, or other such tolerances, as would be readily recognized by those of ordinary skill in the art upon study of this disclosure.

DETAILED DESCRIPTION OF THE INVENTION

The mold apparatus disclosed herein is configured for simultaneous communication of a resin having a color and a complementary resin having a complementary color into a mold cavity without intermixing between the resin and the complementary resin in order to form an object wherein the color is essentially separated from the complementary color, in various aspects. While the color and the complementary color differ from one another, the resin and the complementary resin may comprise essentially the same material except for color, in various aspects. In various aspects, the object formed by the mold apparatus may be configured as a fishing lure body, which is a molded portion of a fishing lure. The fishing lure includes the fishing lure body and the fishing lure may further include a hook, an attachment such as a swivel, streamers, and so forth disposed about the fishing lure body. The fishing lure body has a top and a bottom, and the top is of the color and the bottom is of the complementary color, in various aspects.

In various aspects, a barrier and a complementary barrier are aligned with one another to separate the mold cavity in part into a first mold sub-cavity and a second mold sub-cavity. The barrier and the complementary barrier aid in preventing intermixing of the resin with the complementary resin as the resin and complementary resin are communicated into the mold thereby enhancing separation of the color from the complementary color in the object along a color divide, in various aspects. The resulting object has two colors in lamination with one another along the color divide.

Resin and complementary resin may be a material convertible into polymer as used in molding an object formed of polymer, as would be readily understood by those of ordinary skill in the art upon study of this disclosure. Resin may include various catalysts and other additives, in various aspects. Fluidly communicable resin may refer to resin, for example, in a liquid, flowable, molten, or fluid state. Resin may be fluidly communicated into the mold cavity by injection, by pouring, and so forth, as would be readily understood by those of ordinary skill in the art upon study of this disclosure. Cured resin refers to resin that has solidified from being fluidly communicable into a solid thereby forming an object that is solid. Cured resin is polymerized and may include cross-linked polymer chains. Cure and curing refer to solidification from being fluidly communicable into the polymerized solid. Resin may be fluidly communicable under ambient conditions or may be rendered fluidly communicable by heating, in various aspects. Curing may be accomplished by heating, cooling, or combinations thereof, in various aspects. Exemplary resins may include, for example, plastisol—a colloidal dispersion of polymer particles in a liquid plasticizer. The polymer particles of plastisol absorb the plasticizer, for example, when heated to around 180° C., which causes the polymer particles to swell and fuse together thereby forming a viscous gel. The viscous gel is then cured by cooling below, for example, about 60° C. to form a flexible plasticized solid object. In various aspects, the polymer particles of plastisol comprise polyvinyl chloride. In various aspects, the object formed from plastisol may have a Shore hardness in a range of from about 5 to about 80 on the Shore A scale. Note that plastisol should be considered as exemplary only and not limiting.

In various aspects, mold apparatus disclosed herein may be used in resin casting wherein the mold cavity is filled with a flowable resin that cures upon application of heat. In various aspects, mold apparatus disclosed herein may be used in injection molding wherein flowable resin is injected into the mold cavity. The heated flowable resin in the mold cavity is then cured by reducing the temperature. Of course, mold apparatus and related methods of use and manufactures disclosed herein may be used in conjunction with various other materials, molding processes, and manufactures, as would be readily recognized by those of ordinary skill in the art upon study of this disclosure.

Figure 1B:
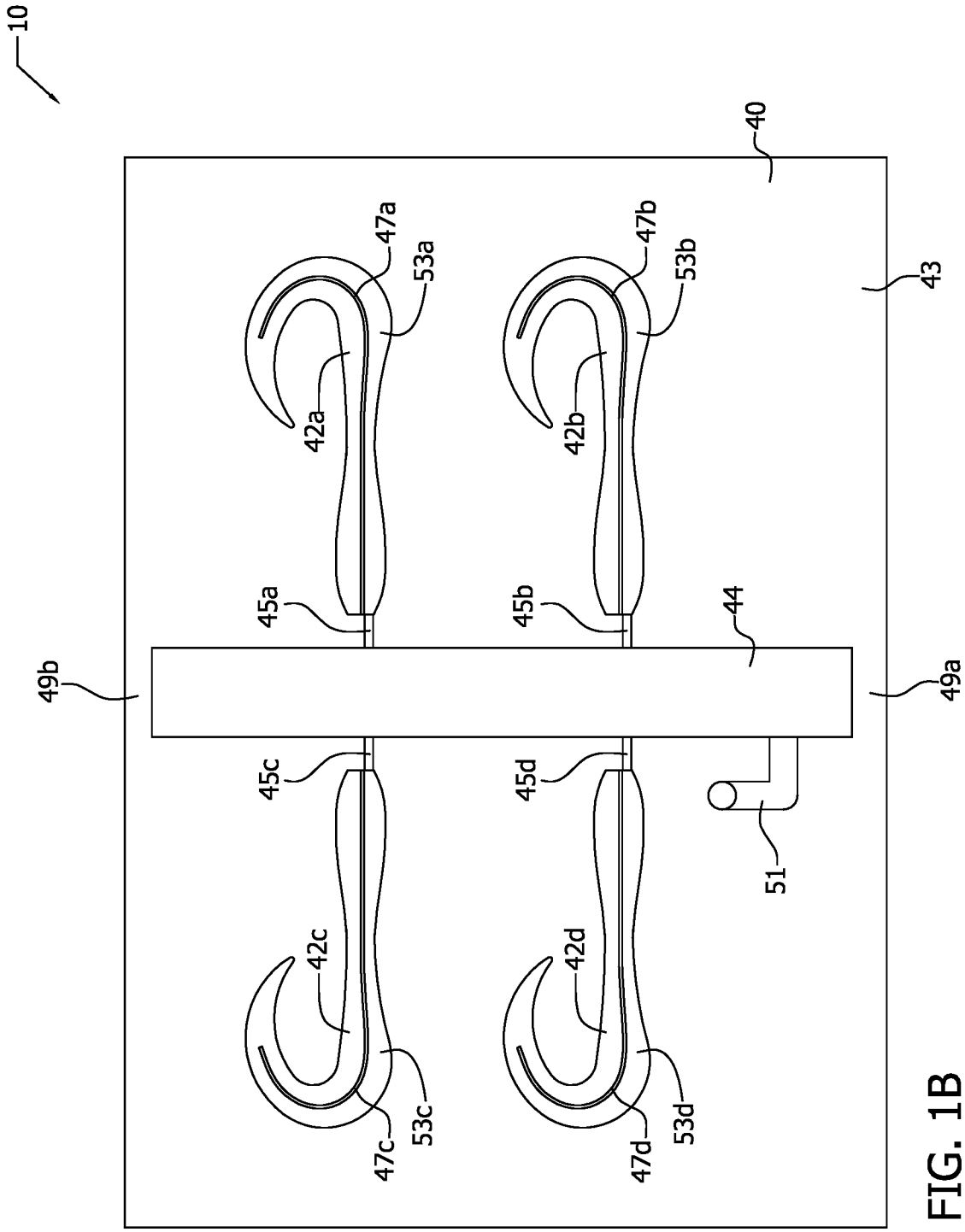
FIG. 1B illustrates by plan view a complementary die portion of the exemplary implementation of the mold apparatus.
Figure 1C:
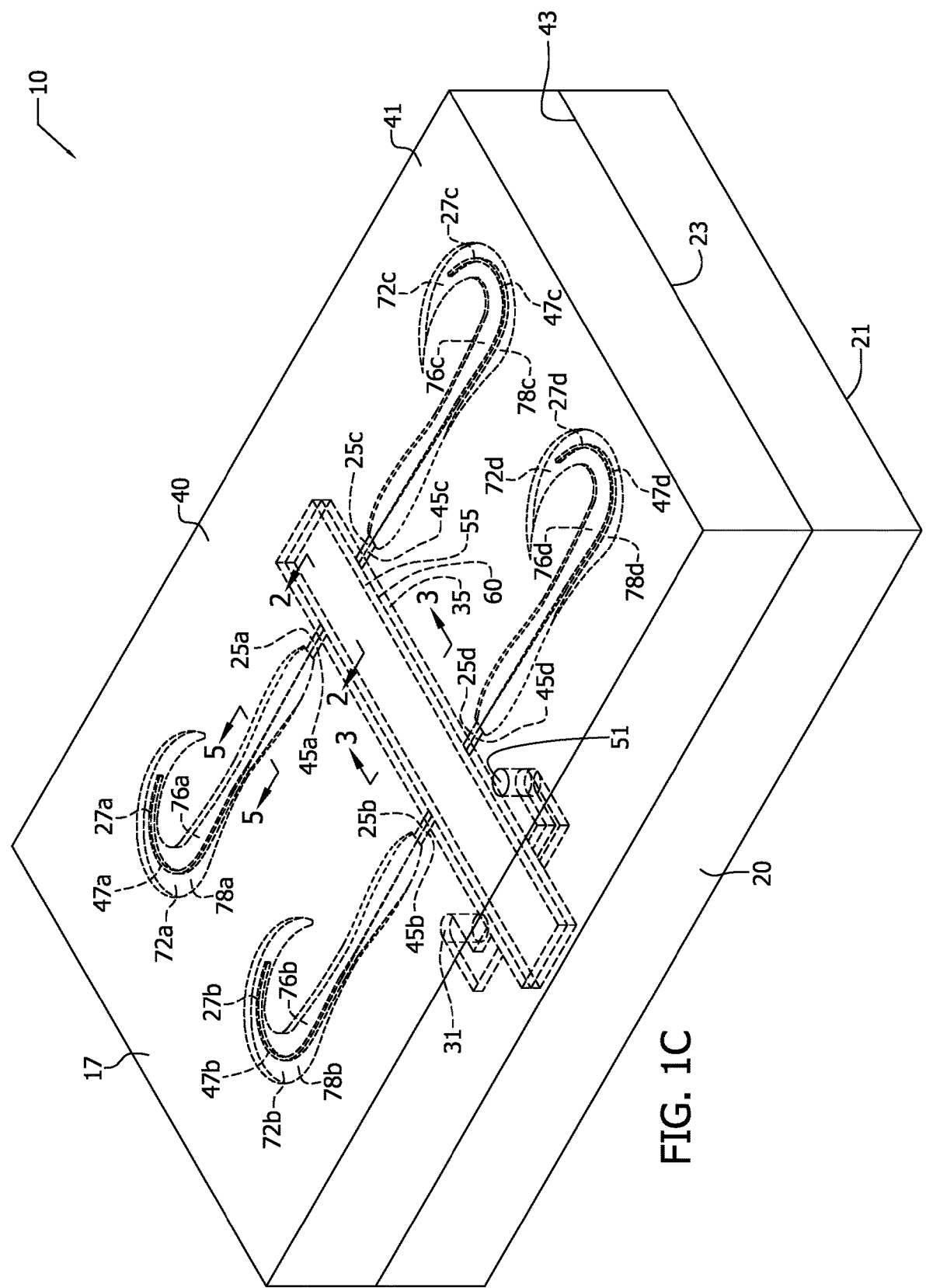
FIG. 1C illustrates by perspective view an exemplary assembly comprising the die portion of the exemplary implementation of the mold apparatus of FIG. 1A in mechanical cooperation with the complementary die portion of the exemplary implementation of the mold apparatus of FIG. 1B.

FIGS. 1A, 1B and 1C illustrate exemplary mold apparatus 10, with FIG. 1A illustrating die 20, FIG. 1B illustrating complementary die 40, and FIG. 1C illustrating die 20 and complementary die 40 in mechanical cooperation with one another with surface 23 of die 20 biased against surface 43 of die 40 thereby forming assembly 17.

As illustrated in FIG. 1A, die 20 includes cavities 22a, 22b, 22c, 22d defined by cavity surfaces 33a, 33b, 33c, 33d, respectively, recessed in surface 23, and each cavity surface 33a, 33b, 33c, 33d is shaped at least in part as a negative impression of portions of object 80 (see FIGS. 7A, 7B) being manufactured. Note that this implementation, which is offered for explanatory purposes, illustrates four cavities 22a, 22b, 22c, 22d so that four objects 80 may be molded simultaneously. It should be understood that die 20 may include any number of cavities, such as cavities 22a, 22b, 22c, 22d, for simultaneous molding of any number of objects, such as object 80, as would be readily recognized by those of ordinary skill in the art upon study of this disclosure. Also, object 80 is configured as a fishing lure body for purposes of explanation. It should be understood the object, such as object 80, and, thus, cavities, such as cavities 22a, 22b, 22c, 22d, may assume various shapes as may be required for various and sundry manufactures, as would be readily recognized by those of ordinary skill in the art upon study of this disclosure.

Figure 2:
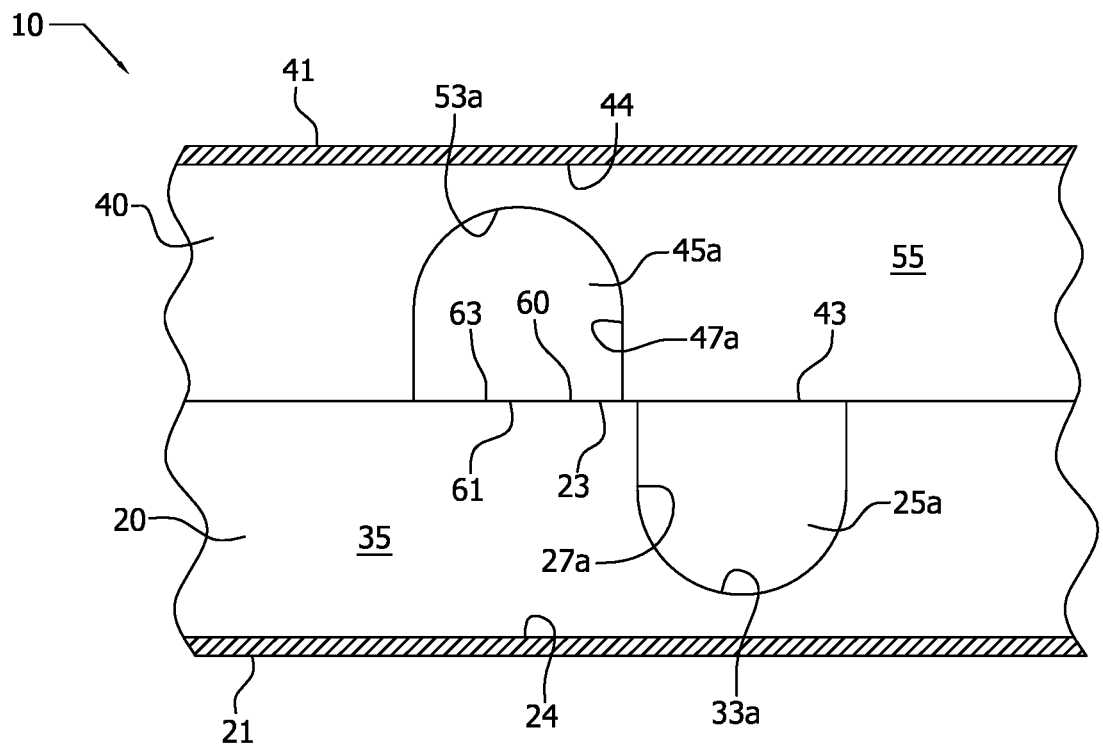
FIG. 2 illustrates by cross-sectional elevation view portions of the exemplary implementation of the mold apparatus.

Divider 60 may be affixed to die 20 to enclose channel 24 with surface 61 thereby defining passage 35 (see FIG. 2). When so affixed, surface 63 of divider 60 is continuous with surface 23 of die 20. Divider 60 is illustrated in FIG. 1A as partially received by die 20 with intermediate portions cut-away for explanatory purposes. Channel 24 is terminated by blocks 29a, 29b and divider may be affixed to blocks 29a, 29b by one or more fasteners (not shown) in order to affix removably divider 60 at least in part to die 20. Holes are illustrated in blocks 29a, 29b and corresponding holes are illustrated in divider 60 for reception of such fasteners. Die 20 including channel 24 may be configured to cooperate with divider 60 in various ways, as would be readily recognized by those of ordinary skill in the art upon study of this disclosure. Because channel 24 is terminated by blocks 29a, 29b, channel 24, and, thus passage 35, is internal to die 20. Blocks 29a, 29b may be recessed from surface 23 to accommodate divider 60 so that surface 63 of divider 60 matches surface 23 of die 20 when divider 60 is affixed thereto. Input passage 31, which is formed as a channel in surface 23 terminating at a hole passing between surfaces 21, 23 of die 20, allows for fluid communication of flowable resin 81 (see FIG. 3) between surface 21 of die 20 and passage 35. Divider 60 may be removed, for example, to allow cleaning of divider 60 and channel 24.

As illustrated in FIG. 1A, barrier 27a is formed as a part of cavity surface 33a, and barrier 27a extends from channel 24 through portions of cavity 22a to separate cavity 22a into two portions, as illustrated. Portions of cavity surface 33a formed as a negative impression of portions of object 80 also include barrier 27a, as illustrated. Note that barrier 27a is curved, in this implementation, but barrier 27a may be straight or have various other configurations depending upon the shape of cavity surface 33a, in various other implementations. Also, note that barrier 27a extends from passage 35 only partially through cavity 22a, in this implementation, but barrier 27a may extend variously into cavity 22a including completely through cavity 22a from passage 35, in various other implementations. Other portions of cavity surface 33a form, in part, cavity passage 25a for fluid communication of cavity 22a with passage 35. Note that cavity passage 25a is disposed to one side of barrier 27a.

Cavities 22b, 22c, 22d are configured similarly to cavity 22a, in this implementation. As illustrated, cavity 22b is separated into two portions by barrier 27b, cavity 22c is separated into two portions by barrier 27c, and cavity 22d is separated into two portions by barrier 27d. Cavity passages 25b, 25c, 25d formed in part by portions of cavity surfaces 33b, 33c, 33d allow fluid communication between cavities 22b, 22c, 22d, respectively, and passage 35. Note that cavity passages 25b, 25c, 25d are disposed to one side of barriers 27b, 27c, 27d, respectively.

As illustrated in FIG. 1B, complementary die 40 includes complementary channel 44 terminated by blocks 49a, 49b. When complementary die 40 is biased against die 20 in mechanical cooperation with die 20 to form assembly 17 (see FIG. 1C), surface 63 of divider 60 encloses channel 44 to define complementary passage 55 (see FIG. 2). Thus, divider 60 separates passage 35 from complementary passage 55. Complementary passage 55 is terminated by blocks 49a, 49b, so that complementary passage 55 is internal to complementary die 40. Input passage 51, which is formed as a channel in complementary surface 43 terminating at a hole passing between surface 41 and complementary surface 43 of complementary die 40, allows for fluid communication of complementary resin 83 (see FIG. 3) between surface 41 of complementary die 40 and complementary passage 55.

As illustrated in FIG. 1B, complementary die 40 includes complementary cavities 42a, 42b, 42c, 42d defined by complementary cavity surfaces 53a, 53b, 53c, 53d recessed in complementary surface 43 of complementary die 40 and shaped as a negative impression of other portions of exemplary object 80. Thus, in this implementation, cavity surfaces 33a, 33b, 33c, 33d in combination with complementary cavity surfaces 53a, 53b, 53c, 53d, respectively, are shaped as entire surfaces of object 80.

As illustrated in FIG. 1B, complementary cavity 42a fluidly communicates with complementary passage 55 (also see FIGS. 2, 3) via complementary passage 45a formed in part by portions of complementary cavity surface 53a. Complementary barrier 47a is formed as a part of complementary cavity surface 53a, and complementary barrier 47a extends from complementary channel 44 through portions of complementary cavity 42a to separate complementary cavity 42a into two portions, as illustrated. Complementary passage 45a is set to one side of complementary barrier 47a, as illustrated. Portions of cavity surface 53a formed as a negative impression of other portions of object 80 include complementary barrier 47a, as illustrated.

Complementary cavities 42b, 42c, 42d are configured similarly to complementary cavity 42a, in this implementation. As illustrated, complementary cavity 42b is separated into two portions by complementary barrier 47b, complementary cavity 42c is separated into two portions by complementary barrier 47c, and complementary cavity 42d is separated into two portions by complementary barrier 47d. Complementary barriers 47a, 47b, 47c, 47d are configured similarly to barriers 27a, 27b, 27c, 27d so that complementary barriers 47a, 47b, 47c, 47d align with barriers 27a, 27b, 27c, 27d when surface 23 of die 20 is in biased engagement with complementary surface 43 of complementary die 40 in assembly 17, illustrated in FIG. 1C. Complementary cavity passages 45b, 45c, 45d allow fluid communication between complementary cavities 42b, 42c, 42d, respectively, with complementary passage 55. Note that complementary cavity passages 45b, 45c, 45d are disposed to one side of complementary barriers 47b, 47c, 47d, respectively.

Die 20, complementary die 40, and divider 60 may be comprised, for example, of aluminum or steel. Die 20 including cavities 22a, 22b, 22c, 22d, complementary die 40 including cavities 42a, 42b, 42c, 42d, and divider 60 may be variously cast, machined from stock, or fabricated in various other ways and combinations of ways, as would be readily understood by those of ordinary skill in the art upon study of this disclosure. While complementary cavities 42a, 42b, 42c, 42d mirror cavities 22a, 22b, 22c, 22d, in this exemplary implementation, complementary cavities 42a, 42b, 42c, 42d may be of different shape or may differ in various other ways from cavities 22a, 22b, 22c, 22d, for example, for molding of asymmetrically shaped objects, in other implementations.

FIG. 1C illustrates surface 23 of die 20 in biased engagement with complementary surface 43 of complementary die 40 to form assembly 17. Surface 63 of divider 60 biases against blocks 49a, 49b of complementary die 40. Die 20 and complementary die 40 may be separably biased with one another using, for example, various fasteners (e.g., screws, bolts, clamps, etc.; not shown), or biased against each other hydraulically or pneumatically. Divider 60 is affixed to die 20 to enclose channel 24 thereby defining passage 35 and to enclose channel 44 with surface 63 thereby defining complementary passage 55, in exemplary assembly 17. Input passage 31 formed in die 20 fluidly communicates between surface 21 and passage 35 and input passage 51 formed in complementary die 40 fluidly communicates between surface 41 and complementary passage 55, in this implementation. Note that passage 35, and complementary passage 55 are enclosed by blocks 29a, 49a, respectively, as illustrated, (and also by blocks 29b, 49b) so that passage 35 and complementary passage 55 are internal to assembly 17 and accessible by input passages 31, 51, respectively.

In exemplary assembly 17, cavities 22a, 22b, 22c, 22d face complementary cavities 42a, 42b, 42c, 42d, respectively, to define mold cavities 72a, 72b, 72c, 72d. Cavity surfaces 33a combined with complementary cavity surface 53a define mold cavity 72a, cavity surface 33b combined with complementary cavity surface 53b define mold cavity 72b, cavity surface 33c combined with complementary cavity surface 53c define mold cavity 72c, and cavity surface 33d combined with complementary cavity surface 53d define mold cavity 72d, in this implementation. Mold cavity 72a is separated in part into first mold sub-cavity 76a and second mold sub-cavity 78a by barrier 27a and complementary barrier 47a, in this implementation. Mold cavity 72b is separated in part into first mold sub-cavity 76b and second mold sub-cavity 78b by barrier 27b and complementary barrier 47b, in this implementation. Mold cavity 72c is separated in part into first mold sub-cavity 76c and second mold sub-cavity 78c by barrier 27c and complementary barrier 47c, in this implementation. Mold cavity 72d is separated in part into first mold sub-cavity 76d and second mold sub-cavity 78d by barrier 27d and complementary barrier 47d, in this implementation. Note that barrier 27a is longitudinally aligned with complementary barrier 47a with both barrier 27a and complementary barrier 47a extending the same length into mold cavity 72a. Similar to barrier 27a and complementary barrier 47a, barrier 27b is longitudinally aligned with complementary barrier 47b, barrier 27c is longitudinally aligned with complementary barrier 47c, and barrier 27d is longitudinally aligned with complementary barrier 47d, to separate mold cavities 72b, 72c, 72d, respectively, in a similar manner, as illustrated.

FIG. 2 illustrates a cross-section of portions of assembly 17 with cavity passages 25a, and complementary cavity passage 45a as viewed from passage 35 and complementary passage 55, respectively. Passage 35 is defined by surface 61 of divider 60 and channel 24 formed in die 20, and complementary passage 55 is defined by surface 63 of divider 60 and complementary channel 44, as illustrated. Surface 63 of divider 60 matches surface 23 of die 20, in this implementation. As illustrated in FIG. 2, cavity passage 25a, and complementary cavity passage 45a are offset with respect to one another. Cavity passage 25a is bounded by portions of cavity surface 33a and by complementary surface 43 of complementary die 40 so that cavity passage 25a communicates fluidly only with passage 35 and not with complementary passage 55, as illustrated. Similarly, complementary cavity passage 45a is bounded by portions of complementary cavity surface 53a and by surface 23 of die 20 so that complementary cavity passage 45a communicates fluidly only with complementary passage 55 and not with passage 35, as illustrated.

Figure 3:
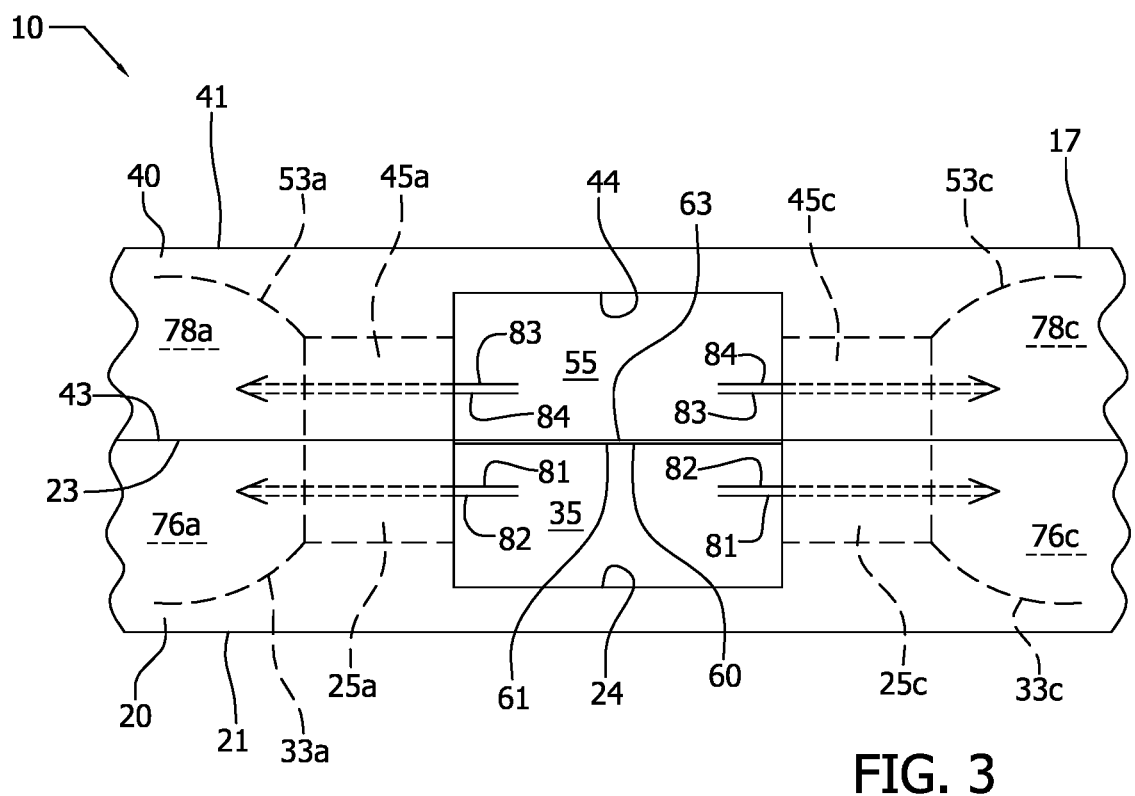
FIG. 3 illustrates by another cross-sectional elevation view portions of the exemplary implementation of the mold apparatus.

In exemplary assembly 17 as illustrated in FIGS. 2 and 3, resin 81 having color 82 may be fluidly communicated from passage 35 into first mold sub-cavity 76a of mold cavity 72a through passage 25a on one side of barrier 27a and complementary barrier 47a, and complementary resin 83 having color 84 may be fluidly communicated from complementary passage 55 into second mold sub-cavity 78a of mold cavity 72a through passage 45a on another side of barrier 27a and complementary barrier 47a. Color 82 differs from complementary color 84, in this implementation. Barrier 27a and complementary barrier 47a inhibit mixing of color 82 of resin 81 in first mold sub-cavity 76a of mold cavity 72a with color 84 of complementary resin 83 in second mold sub-cavity 78a of mold cavity 72a as resin 81 and complementary resin 83 are communicated fluidly simultaneously into first mold sub-cavity 76a and second mold sub-cavity 78a.

FIG. 3 illustrates another cross-section of assembly 17. As illustrated in FIG. 3, complementary resin 83 having complementary color 84 is fluidly communicated from complementary passage 55 into second mold sub-cavity 78a through passage 45a and from complementary passage 55 into second mold sub-cavity 78c through passage 45c. Resin 81 having color 82 is fluidly communicated from passage 35 through passage 25a into first mold sub-cavity 76a, and from passage 35 through passage 25c into first mold sub-cavity 76c, as illustrated in phantom in FIG. 3. Note that barriers 27a, 27b and complementary barriers 47a, 47b are not included in FIG. 3 for clarity of explanation.

Thus, in this exemplary implementation, resin 81 with color 82 is fluidly communicated from passage 35 into first mold sub-cavities 76a, 76b, 76c, 76d of mold cavities 72a, 72b, 72c, 72d, respectively, and complementary resin 83 with color 84 is fluidly communicated simultaneously from complementary passage 55 into second mold sub-cavities 78a, 78b, 78c, 78d of mold cavities 72a, 72b, 72c, 72d, respectively. Portions of object 80 formed in first mold sub-cavity 76a have color 82 and portions of object 80 formed in second mold-sub-cavity 78a have color 84 with a color divide 87 formed therebetween with substantially no intermixing of color 82 with color 84 along color divide 87 (see FIGS. 7A, 7B).

Barrier 27b and complementary barrier 47b inhibit mixing of resin 81 with complementary resin 83 as resin 81 and complementary resin 83 are communicated fluidly simultaneously into first mold sub-cavity 76b and second mold sub-cavity 78b, respectively, of mold cavity 72b. Barrier 27c and complementary barrier 47c inhibit mixing of resin 81 with complementary resin 83 as resin 81 and complementary resin 83 are communicated fluidly simultaneously into first mold sub-cavity 76c and second mold sub-cavity 78c, respectively, of mold cavity 72c. Barrier 27d and complementary barrier 47d inhibit mixing of resin 81 with complementary resin 83 as resin 81 and complementary resin 83 are communicated fluidly simultaneously into first mold sub-cavity 76d and second mold sub-cavity 78d, respectively, of mold cavity 72d.

Figure 4:
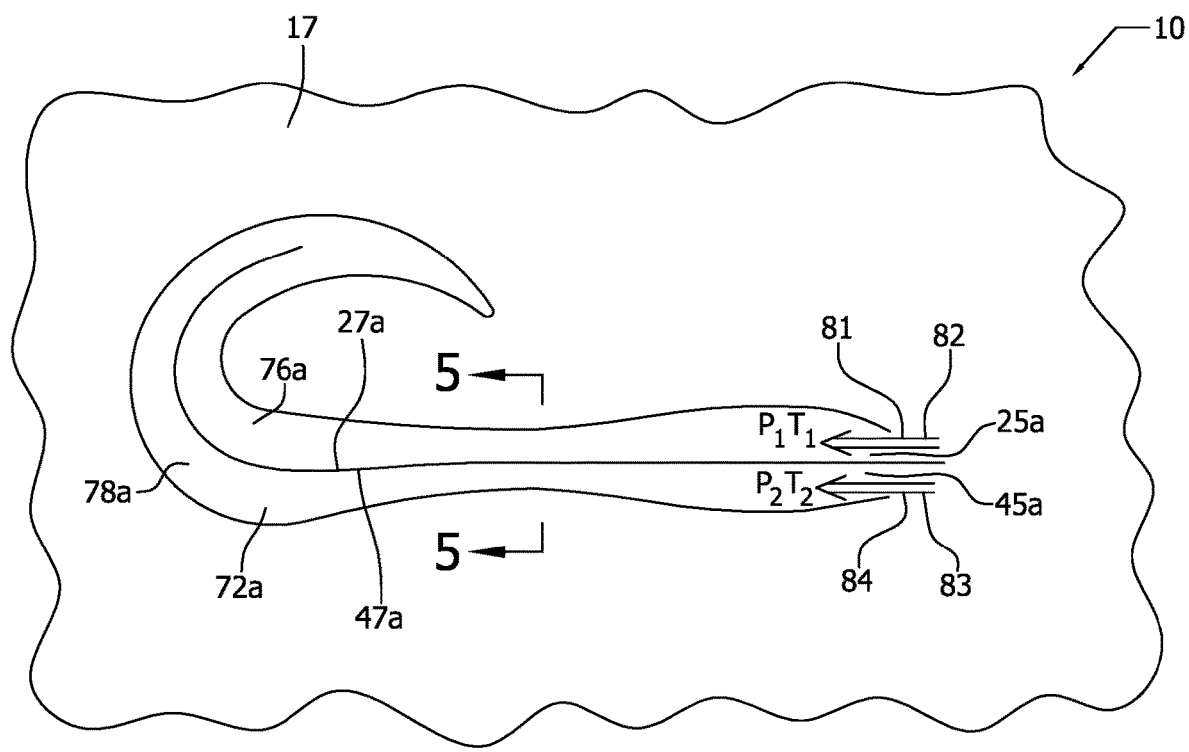
FIG. 4 illustrates by cross-sectional plan view portions of the exemplary implementation of the mold apparatus.

FIG. 4 illustrates mold cavity 72a, with mold cavities 72b, 72c, 72d being configured similarly to mold cavity 72a, in this implementation. As illustrated in FIG. 4, mold cavity 72a of assembly 17 is separated in part into first mold sub-cavity 76a and second mold sub-cavity 78a by barrier 27a and complementary barrier 47a. Barrier 27a is coextensive with complementary barrier 47a and barrier 27a is aligned with complementary barrier 47a, as illustrated. Resin 81 with color 82 is being fluidly communicated into first mold sub-cavity 76a through passage 25a, and complementary resin 83 with complementary color 84 is being fluidly communicated into second mold sub-cavity 78a through passage 45a, as illustrated in FIG. 4. Resin 81 is fluidly communicated at pressure $p_1$ and temperature $T_1$, and complementary resin 83 is fluidly communicated at complementary pressure $p_2$ and complementary temperature $T_2$, as illustrated. Resin 81 and complementary resin 83 are being fluidly communicated simultaneously, in this implementation. Resin 81 may be formed of the same material as complementary resin 83 with resin 81 differing from complementary resin 83 by differing of color 82 with complementary color 84. Pressure $p_1$ may be approximately equal to pressure $p_2$ and temperature $T_1$ may be approximately equal to temperature $T_2$ so that the fluid properties (e.g., density, viscosity) of resin 81 and complementary resin 83 are essentially the same.

Figure 5:
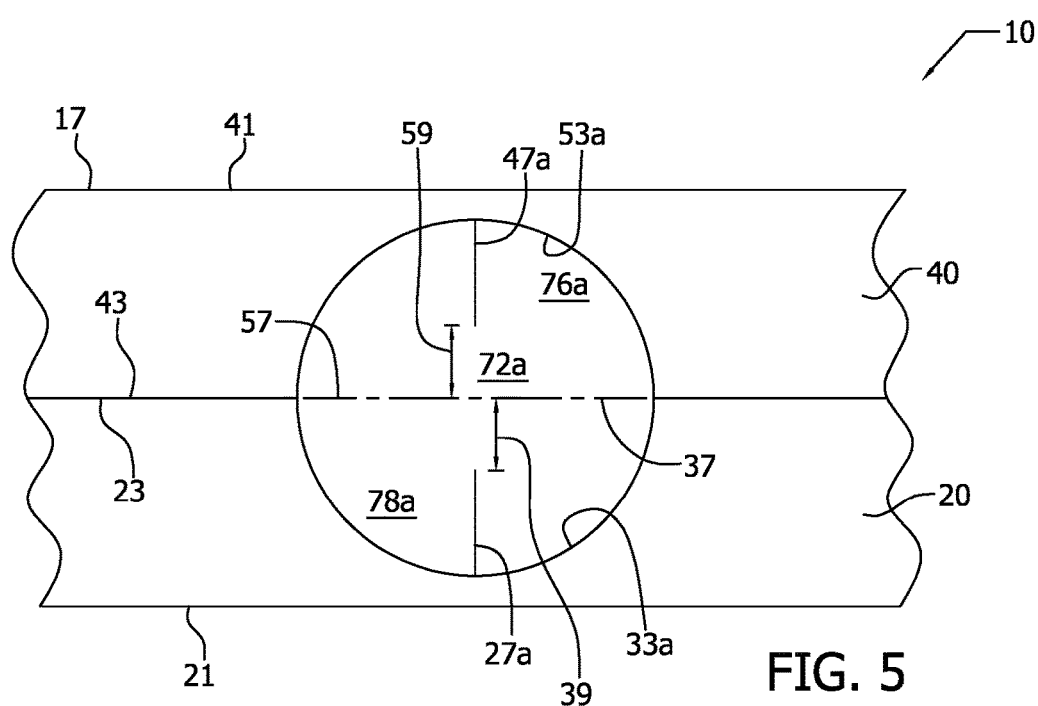
FIG. 5 illustrates by yet another cross-sectional elevation view portions of the exemplary implementation of the mold apparatus.

FIG. 5 further illustrates mold cavity 72a including first sub-cavity 76a separated partly from second sub-cavity 78a by barrier 27a and complementary barrier 47a in assembly 17. Barrier 27a matches complementary barrier 47a in longitudinal extent through mold cavity 72a, and barrier 27a is longitudinally aligned with complementary barrier 47a when surface 23 of die 20 and complementary surface 43 of complementary die are in biased engagement with one another in assembly 17. Note that barrier 27a extends only partway from surface 33a of cavity 22a to plane 37 defined by surface 23 of die 20 so that barrier 27a is offset from plane 37 by gap 39, as illustrated. Gap 39 may or may not vary longitudinally along barrier 27a, in various implementations. Similarly, complementary barrier 47a extends only partway from surface 53a of cavity 42a to complementary plane 57 defined by complementary surface 43 of complementary die 40 so that complementary barrier 47a is offset from complementary plane 57 by gap 59, as illustrated. Gap 59 may or may not vary longitudinally along complementary barrier 47a, in various implementations. Barrier 27a is in spaced relation with complementary barrier 47a separated by gap 39 plus gap 59 when surface 23 of die 20 and complementary surface 43 of complementary die 40 are in biased engagement with one another, as illustrated. Thus, cavity portion 76a is only partially separated from cavity portion 78a by barrier 27a and complementary barrier 47a, in this implementation. This allows for connectedness between portions of the object molded in cavity portion 76a with portions of the object molded in cavity portion 78a by, for example, material in gap 39 plus gap 59.

Figure 6:
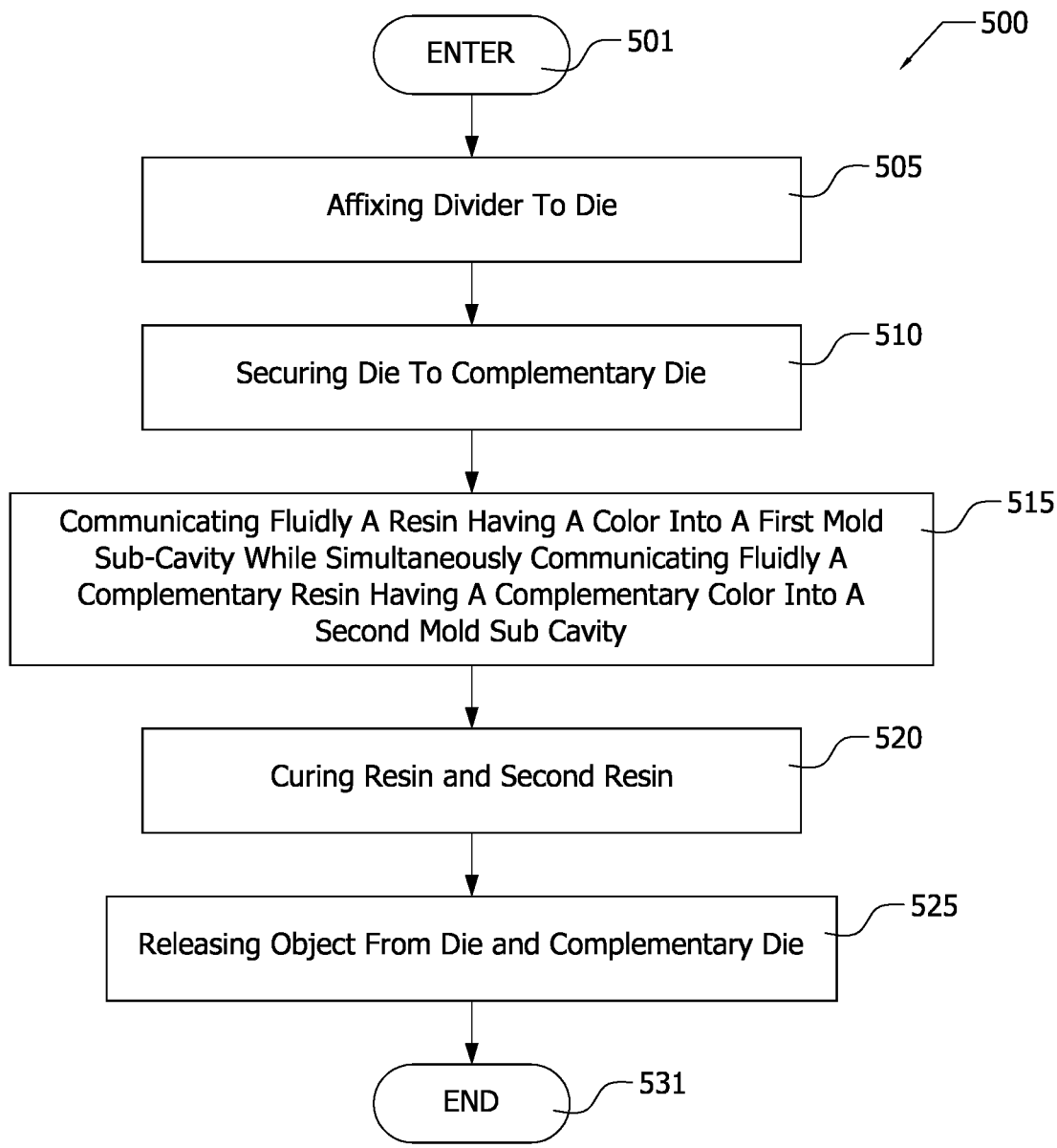
FIG. 6 illustrates by process flow chart exemplary method of operation of the exemplary mold apparatus.

An exemplary method of operation 500 of a mold apparatus, such as mold apparatus 10, is illustrated in FIG. 6. Method 500 is entered at step 501.

At step 505, a divider, such as divider 60, is affixed to a die, such as die 20.

At step 510, the die is placed in biased engagement with a complementary die, such as complementary die 40.

At step 515 a resin having a color, such as resin 81 having color 82, is fluidly communicated into a first mold sub-cavity, such as first mold sub-cavity 76a, 76b, 76c, 76d, while a complementary resin having a complementary color, such as complementary resin 83 having complementary color 84, is simultaneously fluidly communicated into a second mold sub-cavity, such as second mold sub-cavity 78a, 78b, 78c, 78d. The second mold sub-cavity is separated in part from the first mold sub-cavity by barriers and complementary barriers, such as barriers 27a, 27b, 27c, 27d and complementary barriers 47a, 47b, 47c, 47d, respectively.

The resin and complementary resin may be melted (e.g., liquified) to be fluidly communicable by heat exchangers (not shown), pressurized (e.g., by compressed air), and then simultaneously communicated fluidly into the first mold sub-cavity and the second mold sub-cavity. The resin and the complementary resin may be comprised of the same material (e.g., plastisol) differing from one another only by color. The temperature and thus the density of the resin and the complementary resin are generally equivalent as the resin and the complementary resin are communicated into the first mold sub-cavity and the second mold sub-cavity, in various implementations. The flow rates of the resin and complementary resin are monitored and controlled to ensure that the first mold sub-cavity and the second mold sub-cavity are filled generally simultaneously, thus forming color divide 87 as a separation between the color 82 and the complementary color 84 (see FIGS. 7A, 7B), in various implementations.

At step 520, the resin and the complementary resin are allowed to cure thereby forming solid object(s), such as object 80. Several objects may be formed simultaneously.

At step 525, the object(s) are released from the die and the complementary die.

Method 500 terminates at step 531.

Figure 7A:
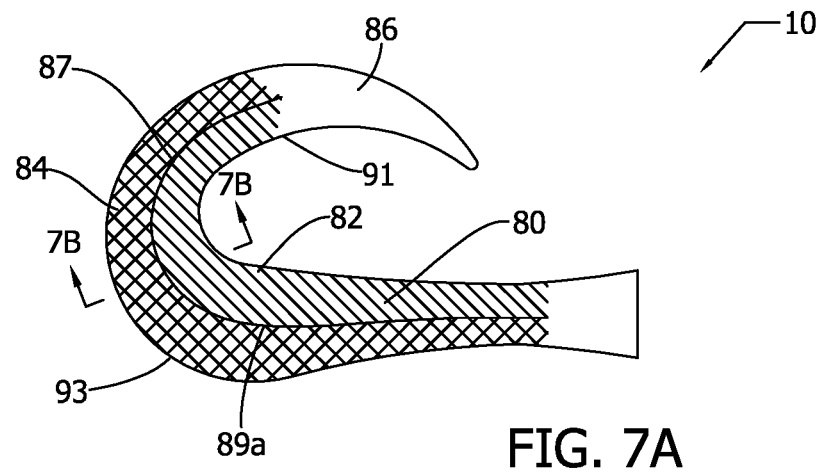
FIG. 7A illustrates by plan view an exemplary object manufactured by the exemplary mold apparatus and exemplary methods of operation.

FIG. 7A illustrates exemplary object 80 molded by exemplary method 500 using a mold apparatus, such as exemplary mold apparatus 10. Object 80 may be formed in any of mold cavity 72a, 72b, 72c, 72d. Exemplary object 80 is configured as a fishing lure body, and exemplary object 80 has the form of a shrimp, in this illustrative implementation. Hook(s), connector, etc. may then be added to exemplary object 80 to form a fishing lure. As illustrated in FIG. 7A, object 80 has been released from the mold cavity and resin 81, and complementary resin 83, from which object 80 has been formed, are cured so that object 80 is solid. As illustrated, object 80 includes color 82 separated from complementary color 84 along color divide 87, with color 82 forming top 91 of object 80 and complementary color 84 forming bottom 93 of object 80. Color divide 87 generally coincides with barrier 27a, 27b, 27c, 27d and complementary barrier 47a, 47b, 47c, 47d in mold cavity 72a, 72b, 72c, 72d, respectively. Mixing between color 82 and complementary color 84 along color divide 87 is minimized so that color divide 87 defines a sharp delineation between color 82 and complementary color 84.

Figure 7B:
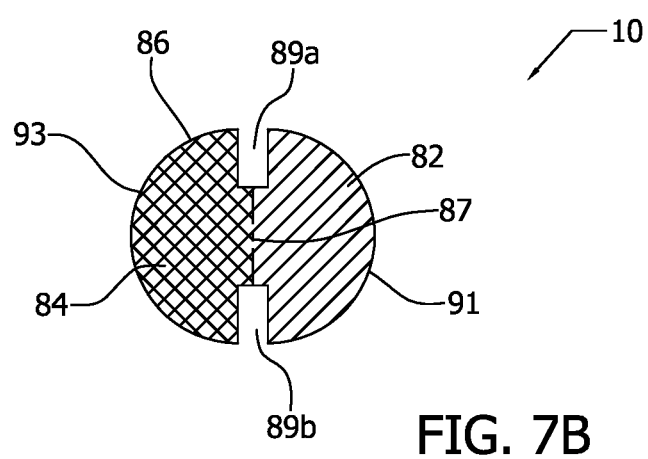
FIG. 7B illustrates by cross-sectional view portions of the exemplary object of FIG. 7A.

FIG. 7B illustrates a cross-sectional slice through object 80 with color 82 separated from complementary color 84 along color divide 87. Object 80 includes mold marks 89a, 89b as impressions in object surface 86 formed by a barrier and a complementary barrier in a mold cavity, such as barrier 27a, 27b, 27c, 27d and complementary barrier 47a, 47b, 47c, 47d in mold cavity 72a, 72b, 72c, 72d, respectively. Color divide 87, that separates color 82 from complementary color 84 passes between mold marks 89a, 89b so as to be coincident with mold marks 89a, 89b, as illustrated in FIG. 7B.

The foregoing discussion along with the Figures discloses and describes various exemplary implementations. These implementations are not meant to limit the scope of coverage, but, instead, to assist in understanding the context of the language used in this specification and in the claims. The Abstract is presented to meet requirements of 37 C.F.R. §1.72(b) only. Accordingly, the Abstract is not intended to identify key elements of the apparatus, methods, and manufactures disclosed herein or to delineate the scope thereof. Upon study of this disclosure and the exemplary implementations herein, one of ordinary skill in the art may readily recognize that various changes, modifications and variations can be made thereto without departing from the spirit and scope of the inventions as defined in the following claims.

The invention claimed is:

1. A method of manufacturing a fishing lure, comprising the steps of:
    a) forming a mold cavity by biasingly engaging a first mating surface of a first die with a complementary second mating surface of a complementary second die, the mold cavity being defined by a first cavity surface of a first cavity formed in the first die and a complementary second cavity surface of a complementary second cavity formed in the second die, the mold cavity partitioned in part into a first mold sub-cavity and a second mold sub-cavity by a first barrier extending forth from the first cavity surface toward a plane defined by the first mating surface and by a complementary second barrier extending forth from the second cavity surface toward a plane defined by the second mating surface, the first barrier and the second barrier being in spaced relation with one another;
    b) communicating fluidly a first resin having a first color into the first mold sub-cavity through a first passage;
    c) communicating fluidly a complementary second resin having a second color into the second mold sub-cavity through a complementary second passage; and
    d) curing the first resin and the second resin to form the fishing lure;
    e) wherein the first resin and the second resin have the same flow properties;
    f) wherein the first resin is communicated into the first mold sub-cavity and the second resin is communicated into the second mold sub-cavity in parallel flow paths at the same time and at the same flow rate;
    g) wherein the first barrier and the second barrier are operable to promote separation of the first resin from the second resin as the first resin flows through the first mold sub-cavity along the longitudinal length of the first barrier and the second barrier and the second resin flows through the second mold sub-cavity along a longitudinal length of the first barrier and the second barrier, thereby inhibiting intermixing of the first resin with the second resin such that the fishing lure has a distinct color divide formed between the first resin and the second resin that coincides with the gap between the first barrier and the second barrier.

2. A method according to claim 1, wherein the first resin is communicated into the first mold sub-cavity and the second resin is communicated into the second mold sub-cavity at substantially the same temperature and pressure.

3. A method according to claim 1, wherein the first resin and the second resin comprise plastisol.

4. A method according to claim 1, wherein the fishing lure has a Shore hardness in a range of from about 5 to about 80 on the Shore A scale.

5. A method of manufacturing a fishing lure, comprising the steps of:
    a) providing a mold apparatus, comprising:
        i) a first die that defines a first cavity having a first cavity surface comprising at least in part a negative impression of a portion of a first surface of the fishing lure to be molded;
        ii) a first barrier configured into the first cavity surface, the first barrier extends from the first cavity surface in gapped relation with a plane of a first mating surface of the first die and the first barrier extends longitudinally along at least portions of the first cavity surface comprising the negative impression of the portion of the first surface of the fishing lure to be molded;
        iii) a complementary second die that defines a complementary second cavity having a complementary second cavity surface formed as a negative impression of a portion of a second surface of the of the fishing lure to be molded;
        iv) a complementary second barrier configured into the second cavity surface, the second barrier extends from the second cavity surface in gapped relation with a plane of a complementary second mating surface of the second die, the second barrier extends longitudinally along at least portions of the second cavity comprising the negative impression of the portion of the second surface of the fishing lure to be molded, the second barrier being longitudinally aligned with the first barrier;
        v) a mold cavity formed by biased engagement between the first mating surface of the first die and the second mating surface of the second die, the mold cavity defined by the first cavity surface and the complementary second cavity surface, the mold cavity partitioned in part into a first mold sub-cavity and a second mold sub-cavity by the first barrier and the second barrier that are longitudinally aligned with one another;
        vi) a first passage in fluid communication with the first mold sub-cavity, the first passage defined at least in part by the first die to communicate fluidly a first resin having a first color into the first mold sub-cavity; and
        vii) a complementary second passage in fluid communication with the second mold sub-cavity to communicate fluidly a complementary second resin having a second color into the second mold sub-cavity, the second passage defined at least in part by the second die;
b) communicating fluidly the first resin having the first color into the first mold sub-cavity through the first passage;
c) communicating fluidly the second resin having the second color into the second mold sub-cavity through the second passage; and
d) curing the first resin and the second resin thereby forming the fishing lure;
e) wherein the first resin and the second resin have the same flow properties;
f) wherein the first resin is communicated into the first mold sub-cavity and the second resin is communicated into the second mold sub-cavity in parallel flow paths at the same time and at the same flow rate;
g) wherein the first barrier and the second barrier are operable to promote separation of the first resin from the second resin as the first resin flows through the first mold sub-cavity along the longitudinal length of the first barrier and the second barrier and the second resin flows through the second mold sub-cavity along the longitudinal length of the first barrier and the second barrier, thereby inhibiting intermixing of the first resin with the second resin such that the fishing lure has a distinct color divide formed between the first resin and the second resin that coincides with the gap between the first barrier and the second barrier.

6. A method according to claim 5, wherein the first resin is communicated into the first mold sub-cavity and the second resin is communicated into the second mold sub-cavity at substantially the same temperature and pressure.

7. A method according to claim 5, wherein the first resin and the second resin comprise plastisol.

8. A method according to claim 5, wherein the fishing lure has a Shore hardness in a range of from about 5 to about 80 on the Shore A scale.

* * * * *